United States Patent [19]

Dowdy

[11] Patent Number: 5,668,697
[45] Date of Patent: Sep. 16, 1997

[54] DATA STORAGE MODULE HAVING CRADLES ON HOUSING AND ELASTOMERIC MEMBER MOUNTED ON DATA STORAGE MECHANISM

[75] Inventor: James L. Dowdy, Eagle, Id.

[73] Assignee: Hewlett-Packard Company, Palo Alto, Calif.

[21] Appl. No.: 425,636

[22] Filed: Apr. 20, 1995

[51] Int. Cl.$^6$ ................................ G06F 1/16; H05K 7/00
[52] U.S. Cl. ..................... 361/685; 361/727; 439/928.1
[58] Field of Search ..................... 361/683, 724–728; 439/928.1

[56] References Cited

U.S. PATENT DOCUMENTS

| 4,937,806 | 6/1990 | Babson et al. | 369/75.1 |
| 5,264,992 | 11/1993 | Hogdahl et al. | 367/681 |
| 5,277,615 | 1/1994 | Hastings et al. | 439/377 |
| 5,568,357 | 10/1996 | Kochis et al. | 361/681 |

FOREIGN PATENT DOCUMENTS 205784  8/1989  Japan .

OTHER PUBLICATIONS

IBM, Technical Disclosure Bulletin vol. 33, No. 9, Friction –Elastomeric Shockmount System For Mechanical Isolation Of A Fragile Device From Source Of Vibration And Shock. Feb. 1991.

*Primary Examiner*—Leo P. Picard
*Assistant Examiner*—Jayprakash N. Gandhi

[57] ABSTRACT

The data storage modules of a data storage system are slidably fitted in an enclosure and are integrated therein mechanically and electrically as a mass data storage system. Each data storage system shock mounts therewithin a disk drive on a four point elastomeric suspension secured to the disk drive. The data storage module has a split module housing having a lower module housing section and an upper module housing section. The elastomeric suspension includes four elastomeric members secured in longitudinally spaced pairs to opposite sides of the disk drive. Four respective pairs of opposed cradles in opposite sides of the upper and lower module housing sections clamp the respective elastomeric members therebetween, with end faces of the elastomeric members in contact with the opposite sides of the lower module housing section, when the upper and lower module housing sections are joined. When joined, the upper and lower module housing sections are secured by a separable hinge at one end and one or more cantilever latch members at the other end.

5 Claims, 4 Drawing Sheets

DATA STORAGE MODULE HAVING CRADLES ON HOUSING AND ELASTOMERIC MEMBER MOUNTED ON DATA STORAGE MECHANISM

CROSS REFERENCE TO RELATED APPLICATION

Application of James L. Dowdy et al entitled "Module Enclosure And Module Latch Mechanism", filed Feb. 14, 1995, Ser. No. 08/388,731, now U.S. Pat. No. 5,575,523 assigned to the assignee of this invention.

TECHNICAL FIELD

This invention relates to data storage modules and, in particular, to such modules which shock mount a disk drive therewithin.

BACKGROUND OF THE INVENTION

Redundant arrays of inexpensive or independent storage devices (RAID) are being employed by the mass storage industry to provide variable capacity storage using pluralities of interconnected disk drives to achieve the desired capacity of mass storage.

With this approach, a disk drive of one design may be fabricated and packaged with another or others to achieve a required data storage capacity. This eliminates the need to fabricate pluralities of individual disk drives of differing storage capacity to meet storage needs, which is expensive.

The individual disk drives of one design are mounted in individual modules which are handled manually. These modules are slidably inserted into and removed from an enclosure in which they are mounted and in which they are electrically interconnected to provide the required data storage capacity for a particular system. Controllers orchestrate the interconnection and control the access of sectors and tracks on selected disk drives for reading or writing data.

Disk drives are high precision electro-mechanical devices having head/disk assemblies in which the heads, in reading and writing modes of operation, fly on the air bearing at the disk surface. The flight height of the head is only a few microns from the surface of a disk. The manual handling of a disk drive of such precision places the disk drive at risk in an abusive shock force environment.

SUMMARY OF THE INVENTION

The data storage modules of a data storage system are slidably fitted in an enclosure and are integrated therein mechanically and electrically as a mass data storage system. Each data storage system shock mounts therewithin a disk drive on a four point elastomeric suspension secured to the disk drive. The data storage module has a split module housing having a lower module housing section and an upper module housing section. The elastomeric suspension includes four elastomeric members secured in longitudinally spaced pairs to opposite sides of the disk drive. Four respective pairs of opposed cradles in opposite sides of the upper and lower module housing sections clamp the respective elastomeric members therebetween when the upper and lower module housing sections are joined which shock mounts the disk drive with respect to shock forces having force components acting vertically, longitudinally and laterally of the disk drive. When joined, the upper and lower module housing sections are secured by a separable hinge at one end and one or more cantilever latch members at the other end.

BRIEF DESCRIPTION OF THE DRAWINGS

The invention will be understood in detail by reference to the following specification when considered in conjunction with the accompanying drawings, in which.

DESCRIPTION OF THE BEST MODE FOR PRACTICING THE INVENTION

Figure 1:
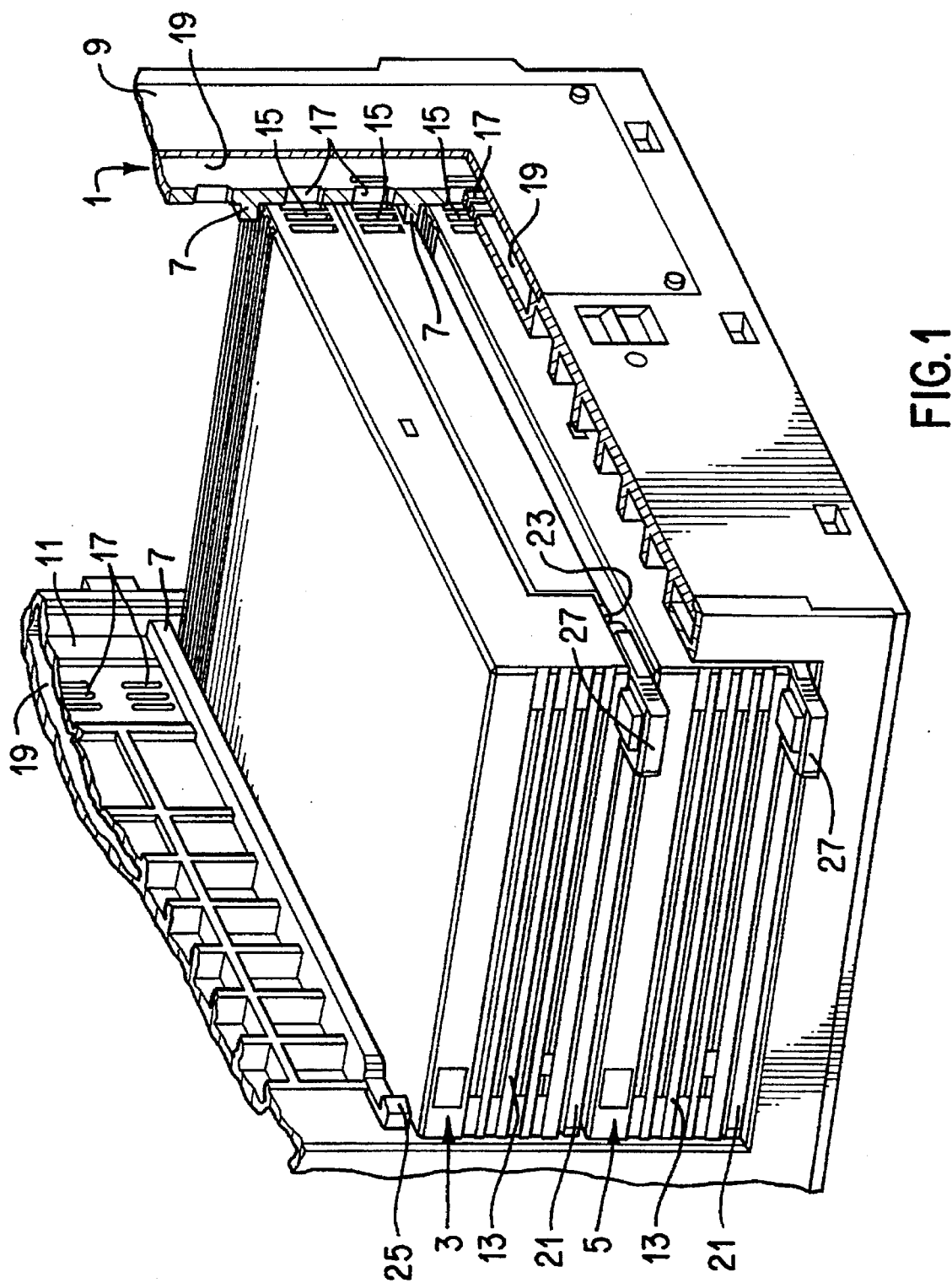
FIG. 1, is an isometric view of a fragmentary portion of a module enclosure for a redundant array of independent devices (RAID).

FIG. 1 is an isometric view of a fragmentary portion of an enclosure 1 for a redundant array of independent devices (RAID). It illustrates the environment in which the data storage module of this invention is employed. In this figure, two data storage modules 3 and 5 are illustrated in the enclosure. The data storage modules 3, 5 are slidably fitted into slots in the enclosure 1. These slots are defined between tracks 7 mounted to the side walls of the enclosure 1. The tracks 7 are only fragmentarily seen in the right side wall 9 of the opposite side walls 9 and 11 of the enclosure 1. The data storage modules 3,5 are of rectangular configuration and each houses a disk drive, as will be described.

The data storage device, such as a disk drive, within each module, is air cooled. To this end, each module has slots 13 in the front end of the module housing and slots 15 in the sides of the module housing at its other end. The slots 15 in the module housing confront metering slots 17 in air ducts 19 in the side walls 9 and 11 of the enclosure 1. A suitable air pressure source (not shown), such as a centrifugal fan in the enclosure 1, creates a low pressure area within the air ducts 19, inducing air flow due to differential pressures which enters the modules 3, 5 at the slots 13 at the front ends of the modules. Air passing through the slots, passes through the module, exiting the module at the slots 15 and entering the air ducts 19 via the metering slots 17. This air flow carries heat away from the disk drives within the module housing.

Figure 2:
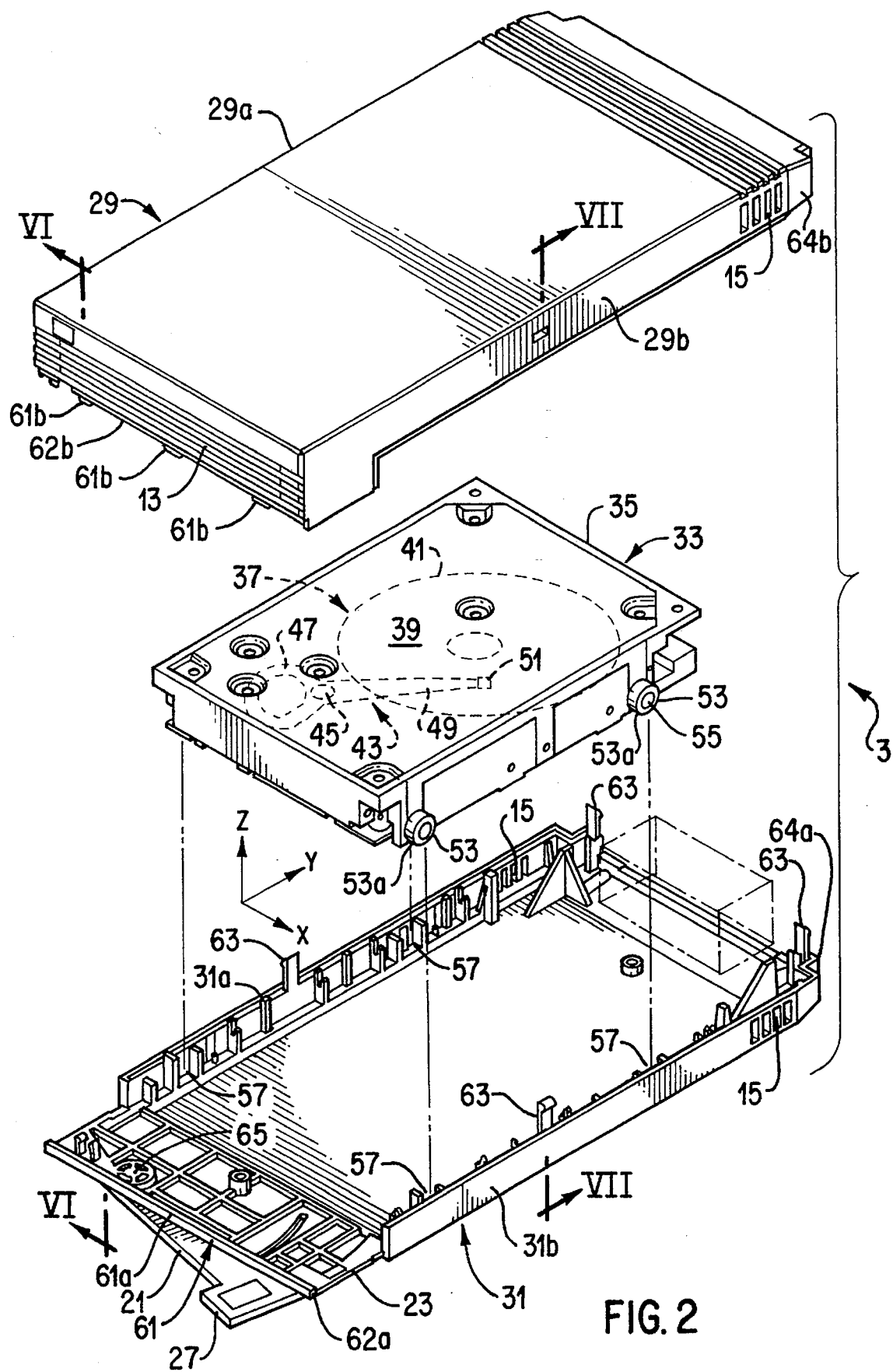
FIG. 2, is an exploded isometric view of a data storage module.
Figure 3:
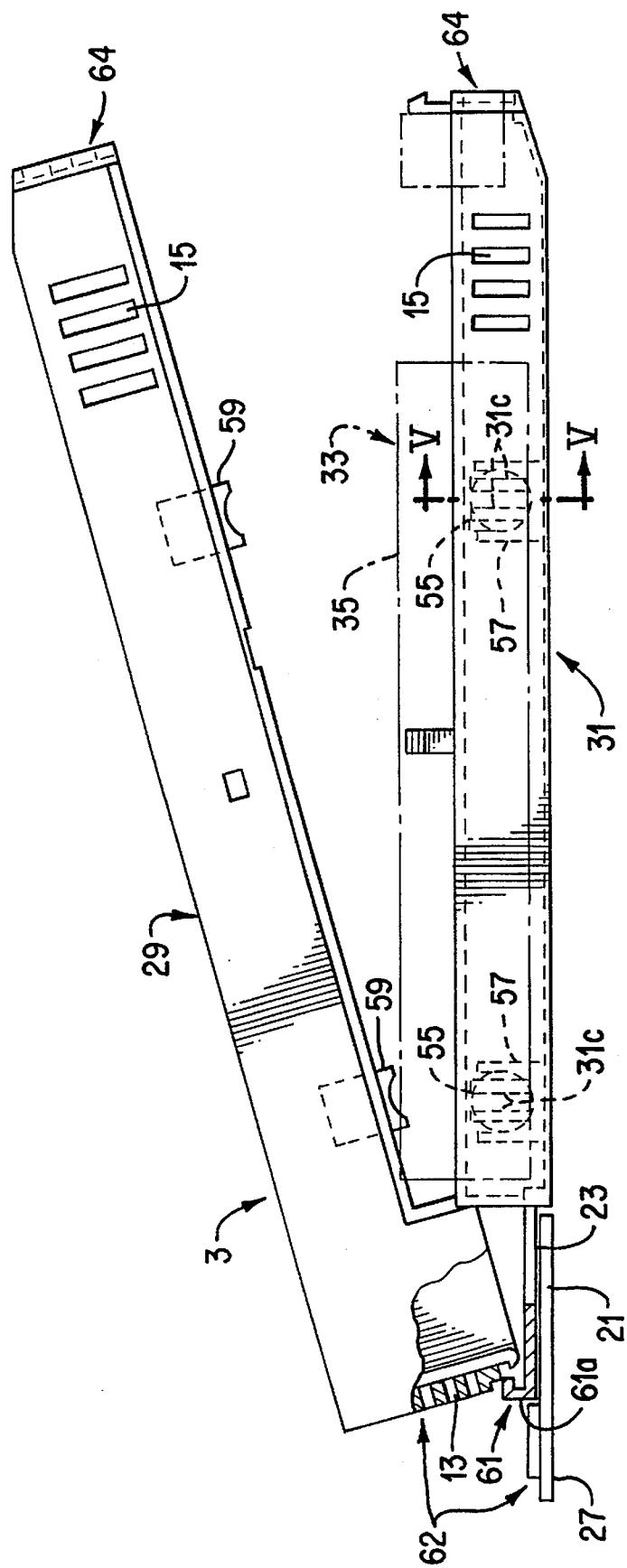
FIG. 3, is a side elevational view, partially in section, to show a separable hinge and other features, of the data storage module.

The disk drives, when the module housings are installed in the enclosure 1, are connected into the electrical network of the RAID system, by means of a multiple pin connector, seen only in dot dash outline in FIGS. 2 and 3, at the rear end of each module housing 3 and 5. These multi pin connectors require considerable manually applied pushing and pulling forces on the module housings to engage and disengage the connector parts.

This installation and removal effort is significantly reduced by the use of a flat latch lever arm 21 which is pivotally mounted by a pivot 65 (FIG. 2) for rotation about an axis intermediate its ends. The flat latch lever arm 21 is mounted in a bottom recess 23 in the front end of each module 3, 5. The latch lever arm 21 is provided with a handle 27 at one end and a latch member (not shown) at its other end. The latch member is designed to engage a catch member 25 at the front end of an adjacent track 7. Such a track and catch member being visible on the front end of a track 7 at the top left side of the data storage module 3 in FIG. 1. Leverage provided by pulling on the handle 27 of the latch lever arm 21 rotates the latch lever arm 21 about its pivotal mount 65 in the recess 23 and about the catch member 23 to a position such as seen in FIG. 2. This pulls the data storage module 3, 5 from its fully inserted position in the slot, in which position the connector parts are engaged, to separate the connector parts, after which the data storage module slides easily on the tracks 7 during removal from the enclosure 1. The operation is reversed during insertion of the module into the slot to the point where the connector parts contact, at which time pushing on the handle 27 of the latch lever arm 21 engages the connector parts. Further detail with respect to this latch arrangement is not provided since the latch lever forms no part of this invention.

As seen in FIGS. 2 and 3, the data storage module 3 comprises an upper housing section 29 and a and front and rear ends 62, 64 respectively. The data storage device, such as a disk drive 33, is mounted within the upper and lower housing sections. The disk drive 33 comprises a sealed housing 35 within which is mounted a head/disk assembly 37 of a disk drive. The disk assembly 39 may comprise one or more disks 41 which are rotated at constant speed. The head assembly comprises a rotary actuator assembly 47 which is pivotally mounted at 45 for rotation about an axis under the power provided by an actuator motor 47. The rotary actuator 43 comprises an arm structure 49 which mounts one or more transducers 51, such as magnetic heads, which scan the adjacent surface of a rotating magnetic disk, in track seeking and track following operational modes.

The disk drive being a delicate, high precision, close tolerance data storage device, is designed to provide thousands of hours of trouble free operation in a mechanically stable environment. However, when installed in a data storage module, which is subject to shock by bumping or dropping, shock protection is indicated.

Figure 5:
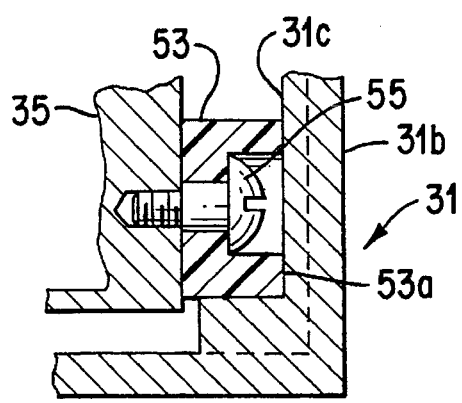
FIG. 5, is a sectional view of an elastomeric member and cradle structure, taken in the section plane V—V of FIG. 3.

According to this invention, to minimize shock forces acting on the head disk assembly, four elastomeric shock bushings 53 are mounted to the disk drive housing 35, in longitudinally spaced pairs on opposite sides of the disk drive housing. The elastomeric shock bushings are cylindrical in shape. Mounting of the shock bushings is achieved employing shoulder type mounting screws 55, FIG. 5, which are axially disposed of the elastomeric bushings and which thread into and seat upon the housing 35. The screw heads are recessed into the shock bushings 53 so that they do not contact the sides of the lower module housing section 31. The recesses in the elastomeric bushings form annular end faces 53a.

Figure 4:
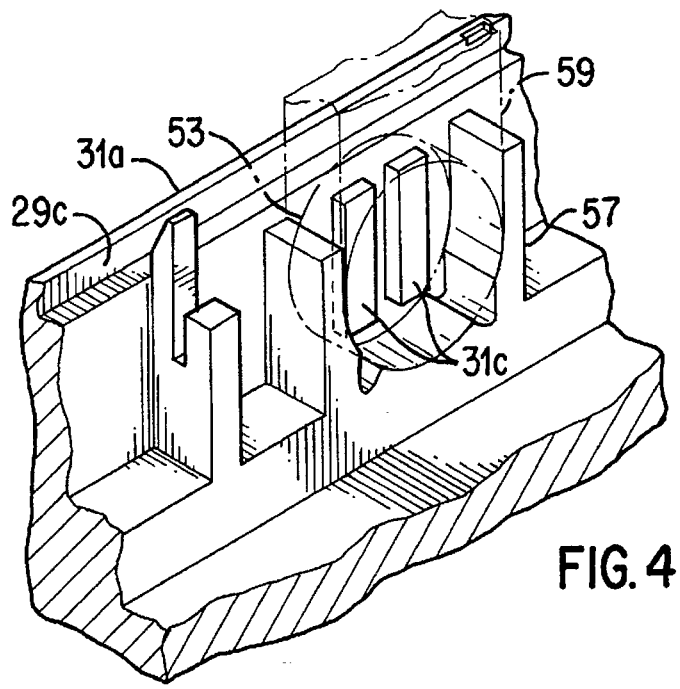
FIG. 4, is an isometric view of a fragmentary portion of one side of the lower module housing section, detailing an assembled cradle structure for an elastomeric shock member.

The cylindrical elastomeric bushings 53 are clamped between respective confronting cradle sections 57, 59, FIGS. 3 and 4, only the lower cradle sections 57 being visible in FIG. 2, which are formed in the interior faces of the sides 29a, 29b of the upper module housing 29 and the interior faces of the sides 31a, 31b of the lower module housing 31. The annular end faces 53a engage molded buffer posts 31c in the sides 31a, 31b in the cradle sections 57. The cylindrical elastomeric bushings 53 absorb shock energy as work done displacing or deforming the elastomeric bushings. The shock energy may have components in any radial direction about the cylindrical elastomeric bushings 53, as well as shock energy having components acting axially thereof. These components are all absorbed in the cylindrical elastomeric bushings.

Figure 7:
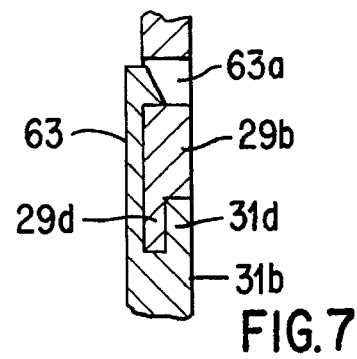

The sides 29a, 29b and 31a, 31b of the module housing sections 29 and 31, FIGS. 3, 4, 7, are provided with flanges 29c, 29d and 31c, 31d at their extremities which overlap when the module housing sections are assembled. The module housing sections 29 and 31 are secured when assembled by a separable hinge 61 at the front end 62 of the module housing and by flexible cantilever latch members 63 on the sides and the rear end 64a of the lower module housing section 31.

Figure 6:
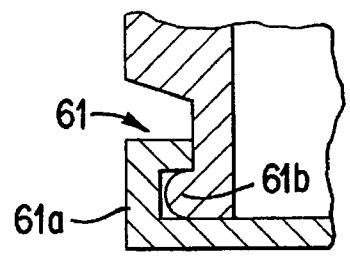
FIG. 6, is a sectional view of the assembled separable hinge taken in the section plane VI—VI of FIG. 2, and FIG. 7, is a sectional view of the overlapping side edges and cantilever latch member of the upper and lower module housing sections taken in the section plane VII—VII of FIG. 2.

The separable hinge 61 comprises a channel 61a formed in the front end 62a of the lower module housing section 31. The open side of the channel 61a faces inwardly of the lower housing section 31. The bottom of the front end of the upper module housing section 29 is provided with projections 61b, FIGS. 3 and 6, which function as hinge pins in the separable hinge 61.

At assembly, the disk drive 33 cylindrical elastomeric shock bushings are seated in the lower cradle sections 57. The upper module housing section is positioned, as seen in FIG. 3, with the separable hinge projections 61b seated upon the surface of the lower module housing section 31, spaced from the open side of the channel and with the upper module housing section 29 tilted upwardly, as seen in FIG. 3. By sliding the upper module housing section 29 to the left, as viewed, in FIG. 3, the projections 61b enter the channel 61a. At this stage of assembly, the upper module housing section is lowered, the hinge projection 61b rotating within the channel 61a. Continued lowering of the upper module housing section 29 engages the flexible cantilever latch members 63 in the openings 63a in the sides and the rear end 64b of the upper module housing section 29, to secure together the upper and lower module housing sections 29 and 31.

In FIG. 2, it will be noted that the latch lever arm 21 is angularly displaced with respect to the lower module housing section 31. This rotation takes place about the axis of the pivot 65 in the recess 23 to which the latch arm is pivotally mounted. This is the position of the latch arm during module withdrawal when the connector is separated and is the position of the latch arm 21 during insertion of the module at the point where the connector parts begin to engage. Force application to the handle 27 forces the module into the slot and engages the connector parts.

What is claimed is:

1. A data storage module, comprising:
   a. a module housing having opposed module housing sections and opposed module housing ends, each module housing section having housing sides;
   b. cradles on said housing sides within each module housing section, respective cradles in one module housing section being opposed to respective cradles in the other module housing section;
   c. a data storage mechanism;
   d. elastomeric members mounted to said data storage mechanism in clamped engagement between opposed cradles in said module housing sections and in engagement with said housing sides, supporting said data storage mechanism on said elastomeric members within said opposed module housing sections;
   e. a first attachment structure at one end of said opposite module housing ends and a second attachment structure at the remaining end of said opposite module housing ends for securing together said module housing sections;

f. said first attachment structure comprises a separable hinge having an axis, said separable hinge comprising a channel mounted to said one module housing section and a projection mounted to said other module housing section, said projection removably fitted into said channel;

g. said second attachment structure comprising a cantilever latch structure; and h. said opposed module housing sections comprising side walls having opposed overlapping edges, said projection being slidably insertable into said channel after said other module housing section is positioned at an angle with respect to said one module housing section about an axis which is substantially parallel to said axis of said separable hinge, rotation of said opposed module housing sections toward each other about said axis of said separable hinge overlapping said opposed edges, engaging said cantilever latch structure and clamping said elastomeric members between said opposed cradles.

2. A data storage module, comprising:

a. a module housing having opposed module housing sections and opposed module housing ends, each module housing section having housing sides;

b. cradles on said housing sides within each module housing section, respective cradles in one module housing section being opposed to respective cradles in the other module housing section;

c. a data storage mechanism;

d. elastomeric members mounted to said data storage mechanism in clamped engagement between opposed cradles in said module housing sections and in engagement with said housing sides, supporting said data storage mechanism on said elastomeric members within said opposed module housing sections;

e. a first attachment structure at one end of said opposite module housing ends and a second attachment structure at the remaining end of said opposite module housing ends for securing together said module housing sections; and f. said first attachment structure comprises a separable hinge having an axis.

3. The storage module according to claim 2, in which:

a. said separable hinge comprises a channel mounted to said one module housing section and a projection mounted to said other module housing section, said projection removably fitted into said channel.

4. A data storage module, comprising:

a. a module housing having opposed module housing sections and opposed module housing ends, each module housing section having housing sides;

b. cradles on said housing sides within each module housing section, respective cradles in one module housing section being opposed to respective cradles in the other module housing section;

c. a data storage mechanism;

d. elastomeric members mounted to said data storage mechanism in clamped engagement between opposed cradles in said module housing sections and in engagement with said housing sides, supporting said data storage mechanism on said elastomeric members within said opposed module housing sections;

e. a first attachment structure at one end of said opposite module housing ends and a second attachment structure at the remaining end of said opposite module housing ends for securing together said module housing sections; and f. said second attachment structure comprises a cantilever latch structure.

5. A data storage module, comprising:

a. a module housing having opposed module housing sections and opposed module housing ends, each module housing section having housing sides;

b. cradles on said housing sides within each module housing section, respective cradles in one module housing section being opposed to respective cradles in the other module housing section;

c. a data storage mechanism;

d. elastomeric members mounted to said data storage mechanism in clamped engagement between opposed cradles in said module housing sections and in engagement with said housing sides, supporting said data storage mechanism on said elastomeric members within said opposed module housing sections;

e. a first attachment structure at one end of said opposite module housing ends and a second attachment structure at the remaining end of said opposite module housing ends for securing together said module housing sections; and f. said elastomeric members are cylindrical having annular end faces in engagement with said housing sides and said cradles each have surfaces of a shape conforming to the cylindrical shape of said elastomeric members.

* * * * *